United States Patent
Sillivent et al.

(10) Patent No.: US 11,383,924 B2
(45) Date of Patent: *Jul. 12, 2022

(54) CONTAINMENT SYSTEM FOR HAZARDOUS OR OTHER MATERIALS

(71) Applicant: TitanLiner, Inc., Fort Worth, TX (US)

(72) Inventors: Gregory F. Sillivent, Granbury, TX (US); Curtis Lee, Cresson, TX (US); Ricky Davalos, Granbury, TX (US)

(73) Assignee: TitanLiner, Inc., Fort Worth, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/094,485

(22) Filed: Nov. 10, 2020

(65) Prior Publication Data

US 2021/0061551 A1    Mar. 4, 2021

Related U.S. Application Data

(63) Continuation of application No. 16/554,317, filed on Aug. 28, 2019, now Pat. No. 10,843,868.

(51) Int. Cl.
*B65D 1/34* (2006.01)
*B65D 90/24* (2006.01)
*B09B 1/00* (2006.01)

(52) U.S. Cl.
CPC ............ *B65D 90/24* (2013.01); *B09B 1/00* (2013.01); *B65D 1/34* (2013.01)

(58) Field of Classification Search
CPC .............................. B65D 1/34; Y10T 24/4406
USPC ...... 220/9.1–9.4, 571, 573; 184/106; 24/462
See application file for complete search history.

(56) References Cited

U.S. PATENT DOCUMENTS

| 3,933,002 A | 1/1976 | Vickery |
| 5,090,588 A | 2/1992 | Van Romer et al. |
| 5,454,195 A * | 10/1995 | Hallsten ............. B65D 90/24  220/495.01 |
| 5,464,492 A | 11/1995 | Gregory et al. |

(Continued)

FOREIGN PATENT DOCUMENTS

WO      02/083493 A1      10/2002

OTHER PUBLICATIONS

International Search Report dated Jan. 22, 2013 in connection with International Patent Application No. PCT/US2012/055342, 3 pages.

(Continued)

*Primary Examiner* — Sunil Singh

(57) ABSTRACT

An apparatus includes a floor having an impermeable material, where the floor has multiple edge portions and each edge portion corresponds to an edge of the floor. The apparatus also includes multiple wall sections configured to form multiple free-standing walls around a perimeter of the floor, where each wall corresponds to one of the edge portions. The apparatus further includes multiple brackets, where each bracket is configured to fit over an associated one of the walls after the corresponding edge portion of the floor is draped over the associated wall. Each bracket is configured to fit against sides of the associated wall so as to hold the corresponding edge portion in place. Each bracket includes (i) first and second plates disposed on opposite sides of the associated wall and (ii) one or more bars extending over a top surface of the associated wall and connecting the first and second plates.

20 Claims, 12 Drawing Sheets

(56) References Cited

U.S. PATENT DOCUMENTS

| | | | |
|---|---|---|---|
| 5,567,259 | A | 10/1996 | Gregory et al. |
| 5,743,984 | A | 4/1998 | Gregory et al. |
| 5,762,233 | A | 6/1998 | Van Romer |
| 5,800,091 | A | 9/1998 | Van Romer |
| 5,968,814 | A | 10/1999 | Blake et al. |
| 6,019,243 | A | 2/2000 | Marino |
| 6,092,686 | A | 7/2000 | Shaw et al. |
| 6,460,299 | B1 * | 10/2002 | Burrow ............... E06B 9/0692 49/466 |
| 6,880,720 | B2 | 4/2005 | Van Romer |
| 7,168,588 | B2 | 1/2007 | Van Romer |
| 7,452,433 | B2 | 11/2008 | Shin et al. |
| 7,736,097 | B2 | 6/2010 | D'Andreta et al. |
| 8,191,722 | B1 | 6/2012 | Town |
| 8,636,445 | B1 | 1/2014 | Williams |
| 8,740,006 | B2 | 6/2014 | Matson |
| 8,998,013 | B2 | 4/2015 | Hopkins et al. |
| 9,126,745 | B2 | 9/2015 | Hopkins |
| 9,221,598 | B2 | 12/2015 | Hopkins |
| 9,303,816 | B1 | 4/2016 | Browning |
| 9,828,173 | B2 | 11/2017 | Hopkins |
| 10,131,494 | B2 | 11/2018 | Hopkins |
| 10,843,868 | B1 * | 11/2020 | Sillivent ............... B09B 1/00 |
| 2003/0053865 | A1 | 3/2003 | Ianniello et al. |
| 2008/0003060 | A1 | 1/2008 | Perkins |
| 2008/0102242 | A1 | 5/2008 | Hamdar et al. |
| 2008/0223857 | A1 | 9/2008 | Palley et al. |
| 2010/0140262 | A1 | 6/2010 | Whitener |
| 2012/0076588 | A1 | 3/2012 | Dupuis et al. |
| 2012/0189810 | A1 | 7/2012 | Whitener |
| 2013/0105475 | A1 | 5/2013 | Marshall |
| 2019/0077590 | A1 | 3/2019 | Hopkins |

OTHER PUBLICATIONS

Written Opinion of the International Searching Authority dated Jan. 22, 2013 in connection with International Patent Application No. PCT/US2012/055342, 6 pages.

Interstate Products, Inc., "Collapsible Wall Spill Berm", http://www.interstateproducts.com/collapsible_wall_spill_berm.htm, printed Apr. 3, 2012, 2 pages.

Falcon Technologies and Services, Inc., "Falcon Equipment Pad, High-Tech Wellsite Protection", 2012, 2 pages.

Interstate Products, Inc., "Flex Wall Spill Berm", http://interstateproducts.com/flex_wall_spill_berms.htm, printed Apr. 3, 2012, 2 pages.

Fol-Da-Tank Co., "Portable Fol-Da-Tank", http://www.fol-da-tank.com/page/secondary_containment.aspx, printed Apr. 3, 2012, 9 pages.

Western Oilfields Supply Co., "Rain for Rent—SpillGuard Portable Berms", http://www.rainforrent.com/products/Spillguards/spillguardspro . . . , printed Apr. 3, 2012, 1 page.

Interstate Products, Inc., "Spill Containment Berms", http://www.interstateproducts.com/spill_berms.htm, printed Apr. 3, 2012, 3 pages.

Versatech Products, Inc., "Versa-Berm", http://versatecg.com/versa-berm.html, printed Apr. 3, 2012, 4 pages.

Office Action dated Jun. 4, 2014 in connection with U.S. Appl. No. 13/616,602, 11 pages.

Office Action dated Jan. 14, 2015 in connection with U.S. Appl. No. 14/284,641, 13 pages.

Office Action dated Apr. 30, 2015 in connection with U.S. Appl. No. 14/284,641, 19 pages.

Examiner-Initiated Interview Summary and Advisory Action dated Jul. 1, 2015 in connection with U.S. Appl. No. 14/284,641, 6 pages.

UltraTech International Inc., "Ultra-Containment Wall", www.spillcontainment.com/products/containment-wall, available as early as Aug. 2016, 5 pages.

Unit Liner Co., "Temporary Containment Structures", http://www.unitliner.com/Temporary-Containment-Structures, available as early as Apr. 2018, 4 pages.

Muscle Wall Holdings LLC, "Muscle Wall Containment system", www.musclewall.com, 2017, 3 pages.

Office Action dated Apr. 9, 2015 in connection with U.S. Appl. No. 14/223,425, 14 pages.

* cited by examiner

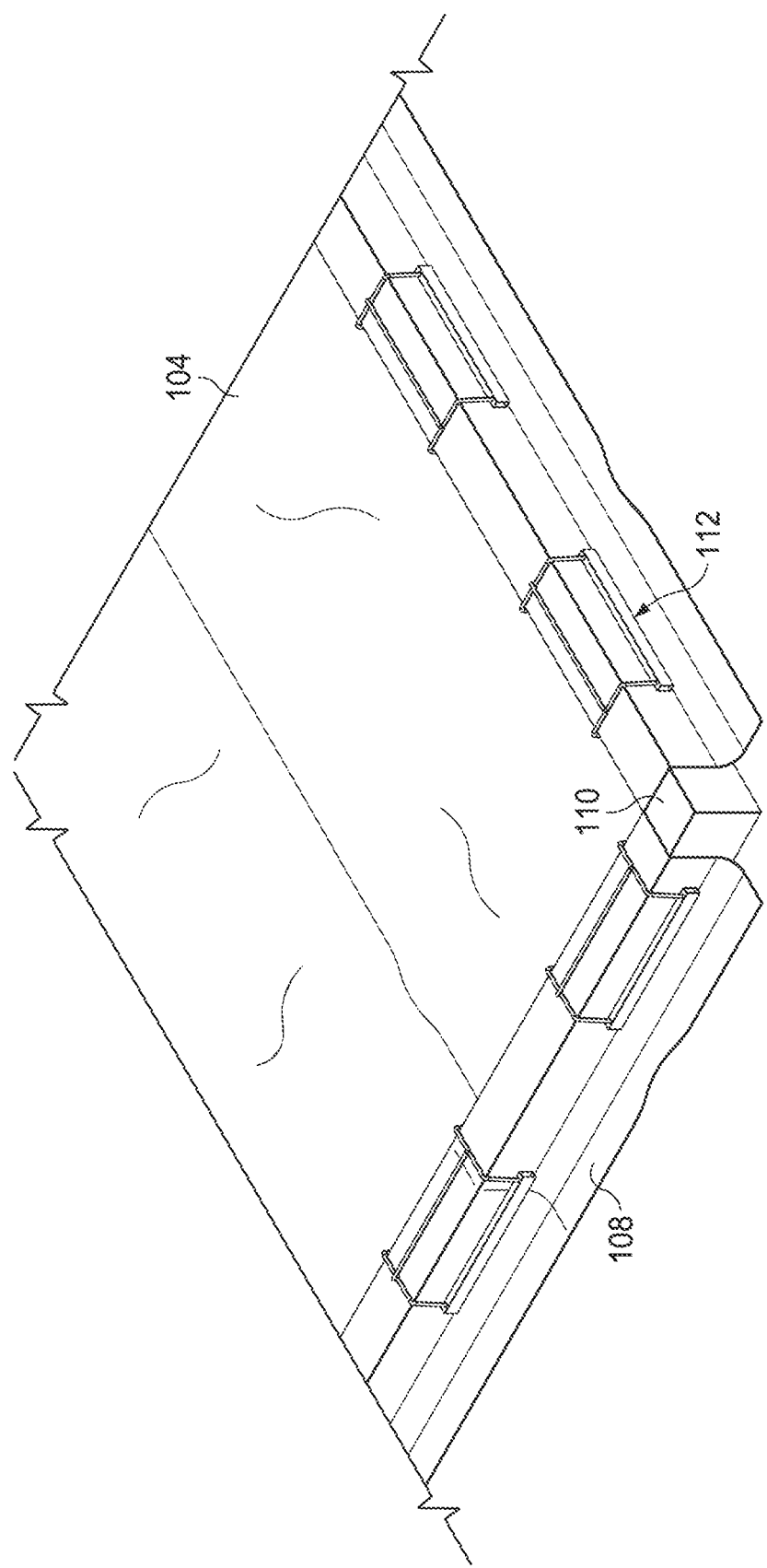

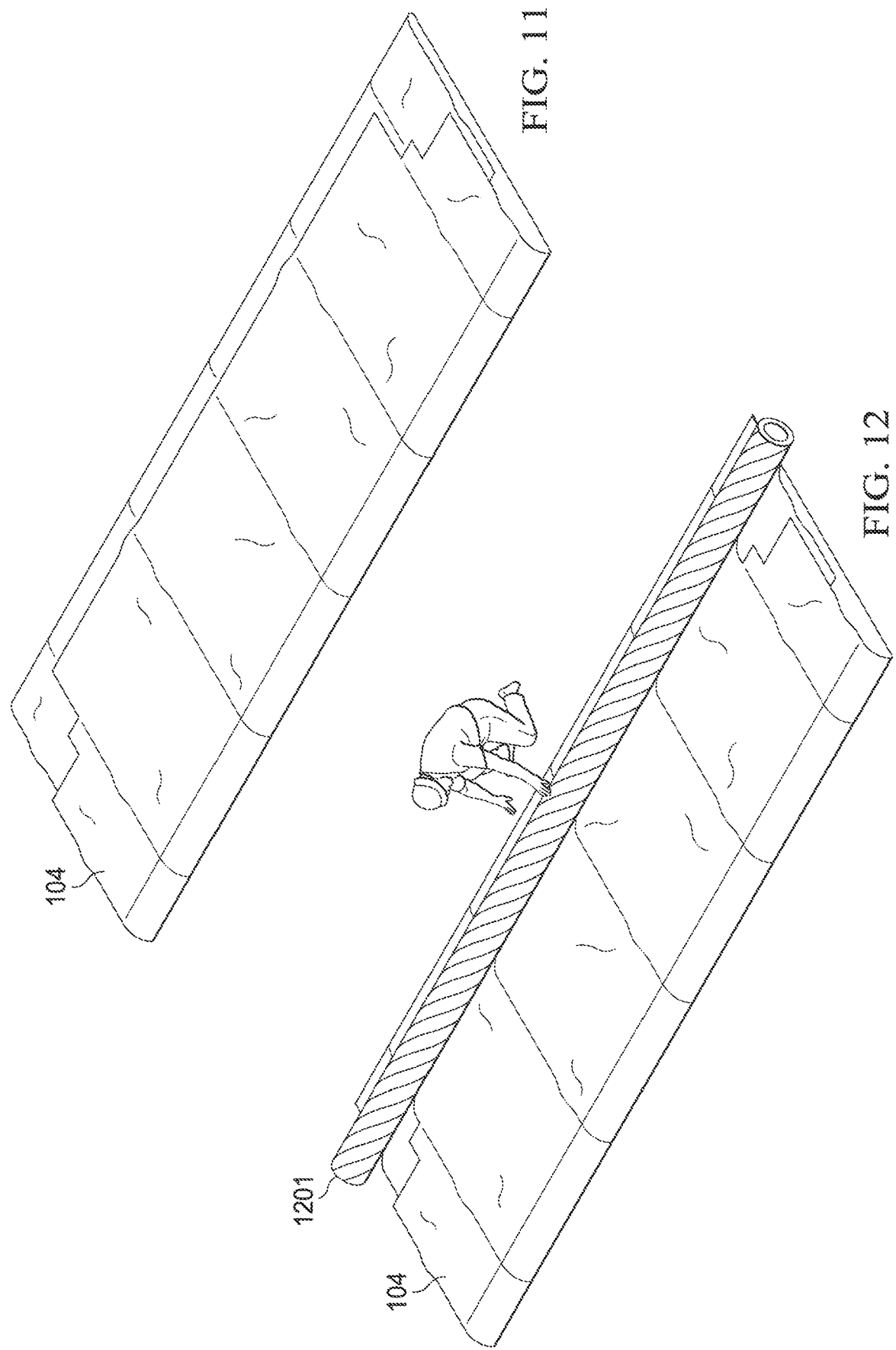

US 11,383,924 B2

CONTAINMENT SYSTEM FOR HAZARDOUS OR OTHER MATERIALS

CROSS-REFERENCE TO RELATED APPLICATION AND PRIORITY CLAIM

This application is a continuation of U.S. patent application Ser. No. 16/554,317 filed on Aug. 28, 2019 (now U.S. Pat. No. 10,843,868), which is hereby incorporated by reference in its entirety.

TECHNICAL FIELD

This disclosure is generally directed to containment systems. More specifically, this disclosure is directed to a containment system for hazardous or other materials.

BACKGROUND

Often times, it is necessary or desirable to prevent material from being released or absorbed into the ground. For example, the release of hazardous or other materials into the ground could contaminate ground water or cause other problems. As a particular example, hazardous or other materials are often stored in tanks, shipping containers, or other storage containers. Any spills or leaks of materials from the tanks or containers could lead to contamination as well as civil or regulatory fines.

SUMMARY

This disclosure provides a containment system for hazardous or other materials.

In a first embodiment, an apparatus includes a floor having an impermeable material, where the floor has multiple edge portions and each edge portion corresponds to an edge of the floor. The apparatus also includes multiple wall sections configured to form multiple free-standing walls around a perimeter of the floor, where each of the multiple walls corresponds to one of the edge portions. The apparatus further includes multiple brackets, where each of the brackets is configured to fit over an associated one of the walls after the corresponding edge portion of the floor is draped over the associated wall. Each of the brackets is configured to fit against sides of the associated wall so as to hold the corresponding edge portion in place. Each of the brackets includes (i) first and second plates disposed on opposite sides of the associated wall and (ii) one or more bars extending over a top surface of the associated wall and connecting the first and second plates.

In a second embodiment, a method includes forming a floor having an impermeable material, where the floor has multiple edge portions and each edge portion corresponds to an edge of the floor. The method also includes forming multiple free-standing walls around a perimeter of the floor using multiple wall sections, where each of the multiple walls corresponds to one of the edge portions. The method further includes forming multiple brackets, where each of the brackets is configured to fit over an associated one of the walls after the corresponding edge portion of the floor is draped over the associated wall. Each of the brackets is configured to fit against sides of the associated wall so as to hold the corresponding edge portion in place. Each of the brackets includes (i) first and second plates disposed on opposite sides of the associated wall and (ii) one or more bars extending over a top surface of the associated wall and connecting the first and second plates.

In a third embodiment, a method includes installing a floor of a containment system at a location for storing one or more materials, where the floor includes an impermeable material and has multiple edge portions. The method also includes assembling multiple free-standing walls of the containment system around a perimeter of the floor, where each of the multiple walls corresponds to one of the edge portions. The method further includes draping the edge portions over the corresponding walls and installing multiple brackets over the walls, where each of the brackets is configured to fit against sides of an associated one of the walls so as to hold the corresponding edge portion in place. Each of the brackets includes (i) first and second plates disposed on opposite sides of the associated wall and (ii) one or more bars extending over a top surface of the associated wall and connecting the first and second plates.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 6 through 13 illustrate portions of the containment system in various stages of manufacture in accordance with this disclosure.

DETAILED DESCRIPTION

FIGS. 1 through 14, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
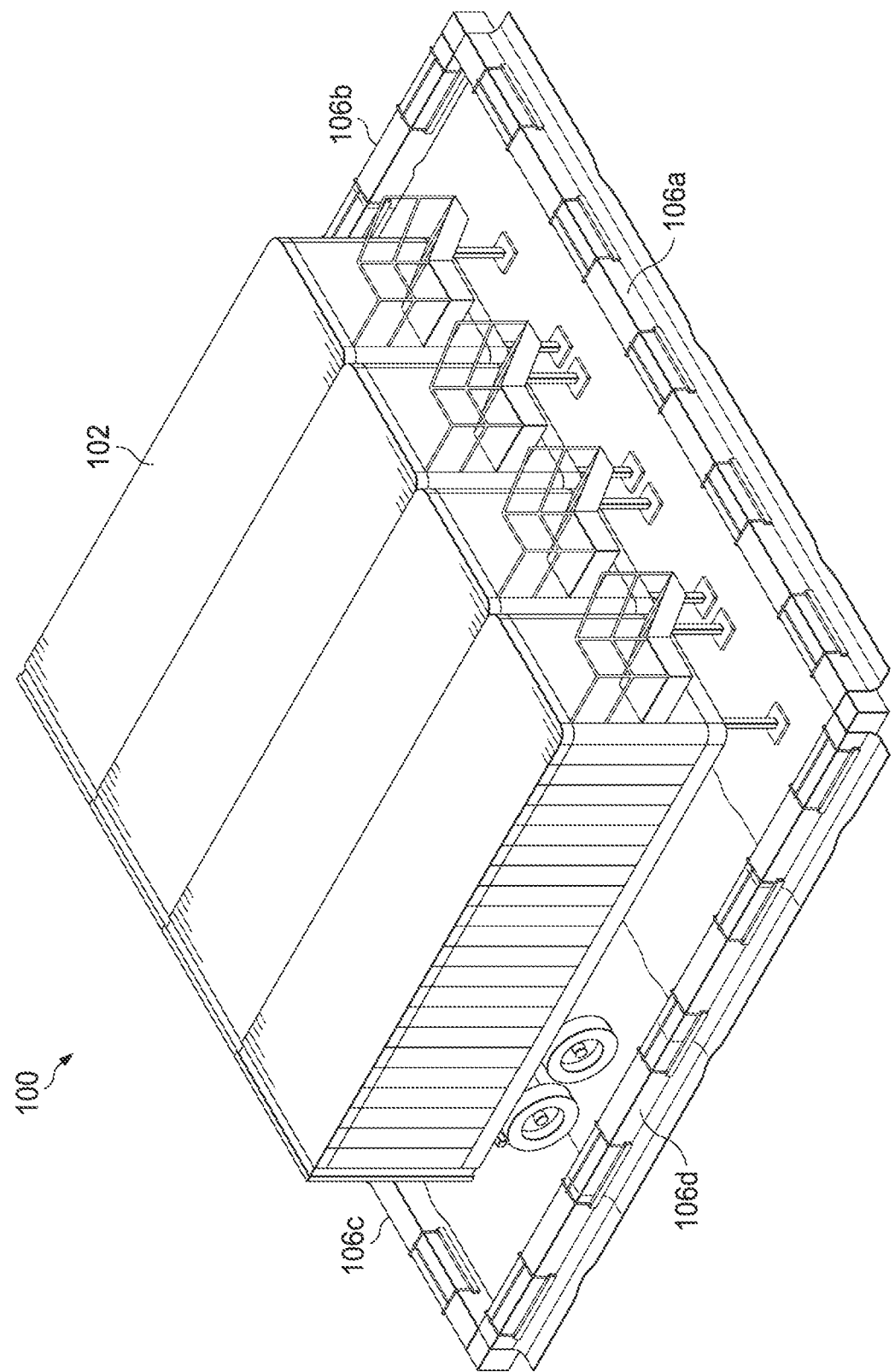
FIGS. 1 through 5 illustrate an example containment system in accordance with this disclosure.

FIGS. 1 through 5 illustrate an example containment system 100 in accordance with this disclosure. In particular, FIG. 1 illustrates the containment system 100 in a completed (installed) state, and FIGS. 2 through 5 illustrate further details of the containment system 100 during an installation process. In FIG. 1, the containment system 100 is in a completed form and provides containment space for multiple instances of containers 102. In FIGS. 2 through 5, the containment system 100 is in various stages of completion.

As shown in FIGS. 1 through 5, the containment system 100 includes a bottom portion or floor 104 and free-standing walls 106a-106d. The containment system 100 operates to contain and hold material between the walls 106a-106d and over the floor 104, thereby helping to prevent the material from being absorbed into the ground. The material could represent hazardous material or other material that leaks or is otherwise discharged from one or more of the containers 102. The size of the floor 104 is scalable and can be selected for containment of one or multiple containers 102. For example, in some embodiments, the floor 104 could be approximately 40 feet by 60 feet. In other embodiments, the floor 104 could have larger or smaller dimensions. Also, in some embodiments, the containment system 100 may represent a seamless structure formed using a liquid-impermeable or other impermeable material, such as polyurea or polyurea-covered fabric. In some embodiments, the polyurea or polyurea-covered fabric could be fire retardant. However, the containment system 100 could be formed from any other suitable materials.

Figure 2:
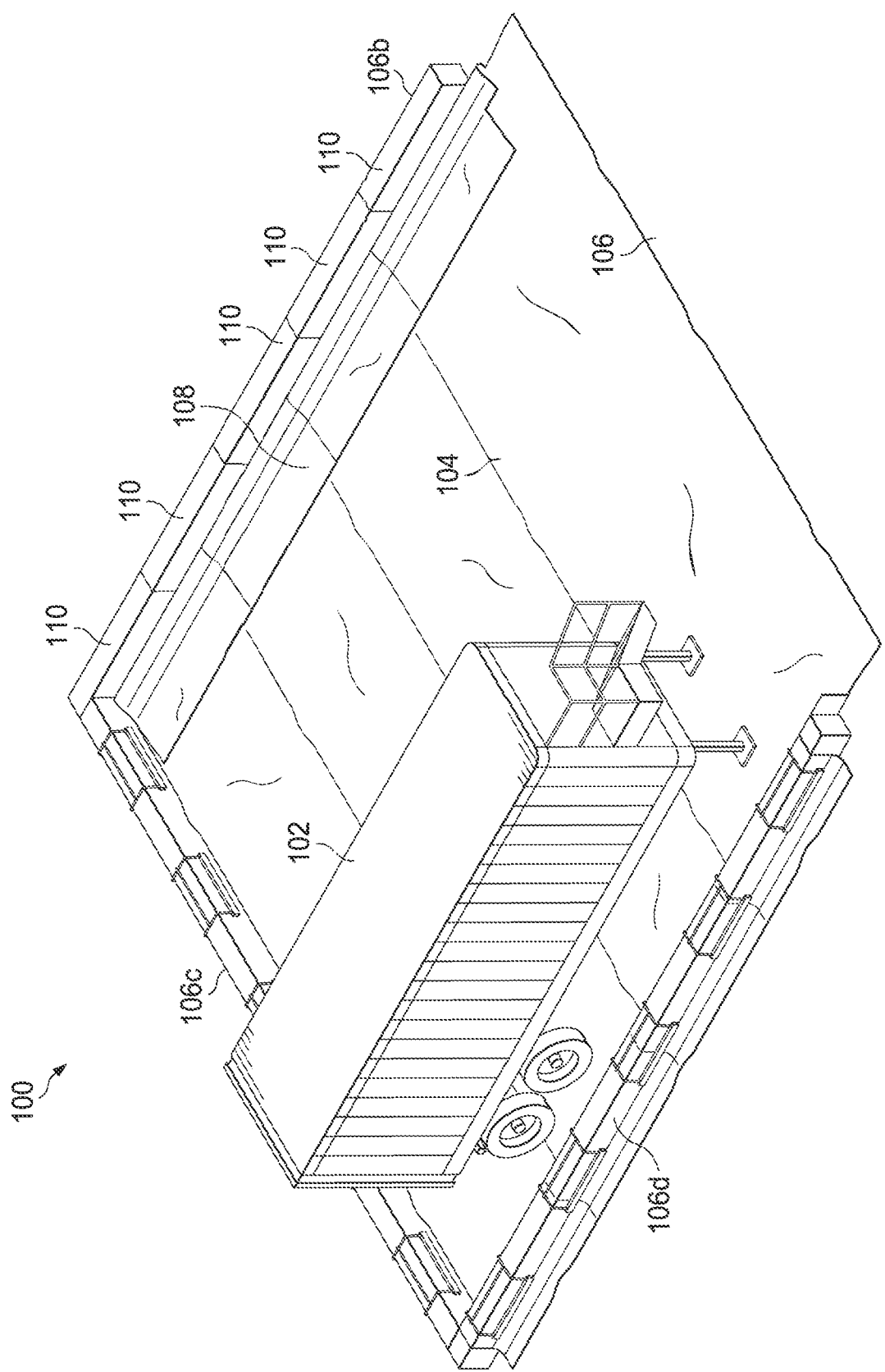
Figure 3:
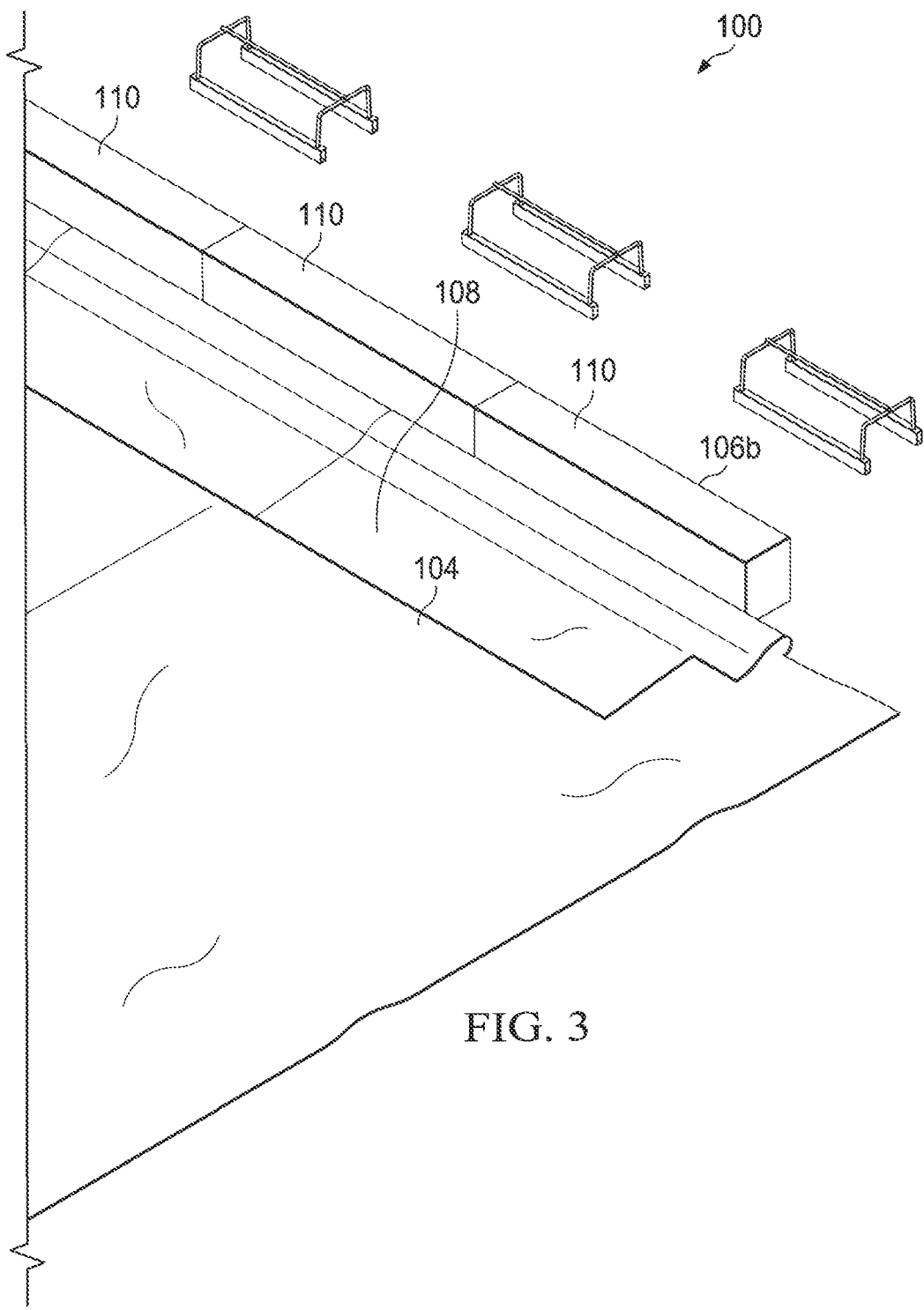

As shown in FIG. 2, once at its intended destination, the floor 104 of the containment system 100 is unfolded or unrolled and laid out on a generally flat surface on the ground. Edge portions 108 of the floor 104 are folded back onto the floor 104, adjacent to where the walls 106a-106d will be positioned. One folded edge portion 108 can be seen in greater detail in FIG. 3. Once the walls 106a-106d are in place, the edge portions 108 are draped over the walls 106a-106d to form an impermeable transition from the floor 104 to the walls 106a-106d. In FIG. 2, the back wall 106c of the containment system 100 is already in place and the edge portion 108 of the floor 104 has already been draped over the back wall 106c, while the right wall 106b is being assembled. The left wall 106d is hidden in FIG. 2 behind a storage container 102, and the front wall 106a is not yet assembled in FIG. 2. The front wall 106a is assembled last as discussed in greater detail below.

Each wall 106a-106d is formed of one or multiple wall sections 110. In FIG. 2, some of the wall sections 110 forming the right wall 106b are already in position adjacent to the floor 104. In some embodiments, multiple wall sections 110 are arranged end-to-end in a straight or curved line to form a wall 106a-106d. As shown in FIGS. 1 through 5, the containment system 100 is rectangular and includes four straight walls 106a-106d. However, this is merely one example. In other embodiments, the containment system 100 could be formed in other shapes with more or fewer walls, and one or more of the walls could be curved.

Each wall section 110 is generally a rectangular prism with dimensions that can selected based on need. In some embodiments, for example, each wall section 110 can be approximately twelve to eighteen inches tall, approximately twelve inches wide, and approximately eight feet long. However, each wall section 110 can have any other suitable dimensions, and different wall sections 110 may or may not have different dimensions. Each of the wall sections 110 can be formed using one or more materials that are selected to be lightweight but rigid and strong. In some embodiments, for instance, the wall sections 110 can be formed from a rigid foam encapsulated in polyurea, which is very lightweight, very strong, and easily formed to any suitable size, shape, and dimensions. In some embodiments, the polyurea could be fire retardant.

Figure 4:
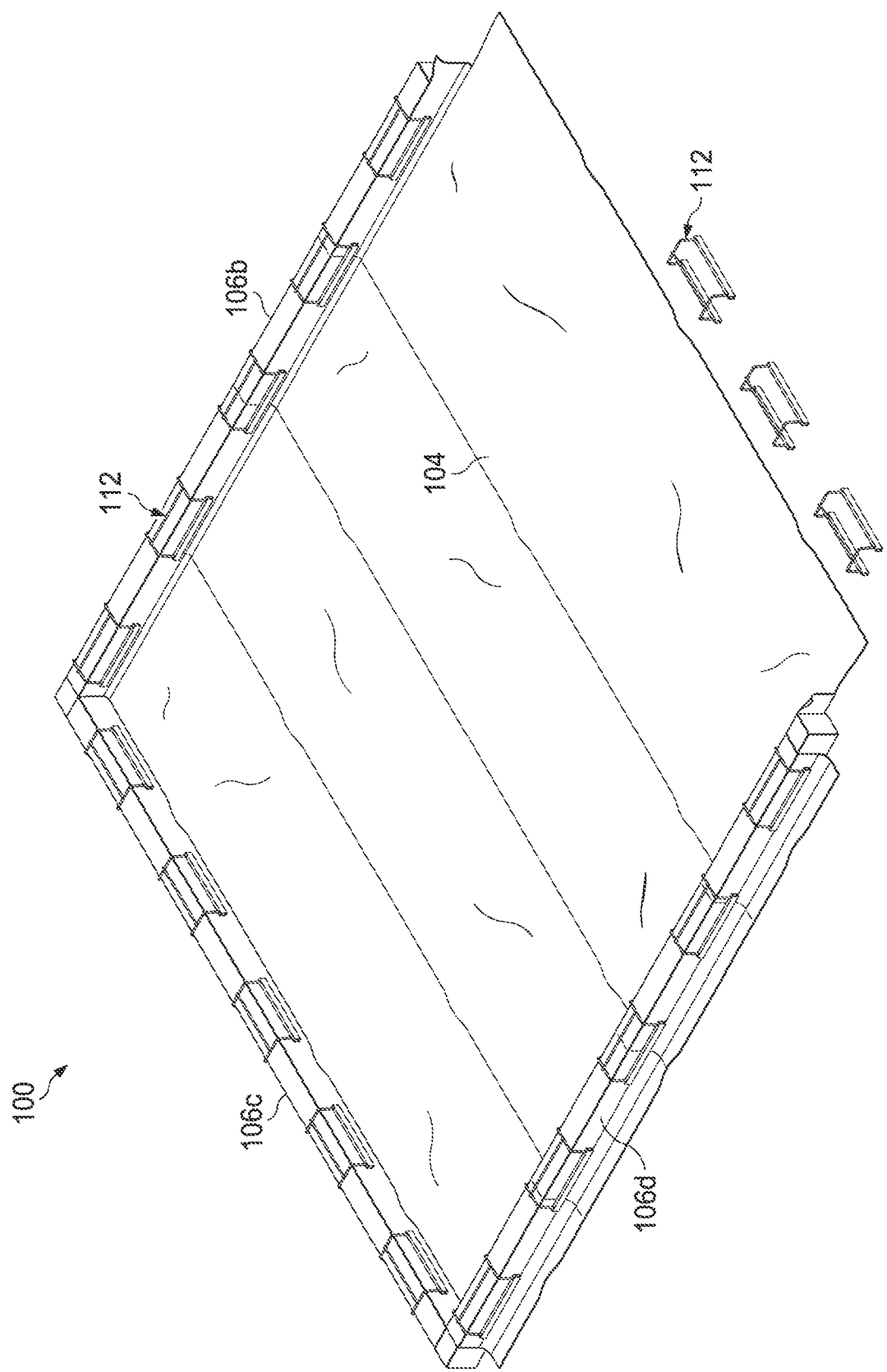

Once each wall 106a-106d is assembled and the edge portion 108 of the floor 104 is folded over that wall 106a-106d, one or more brackets 112 can be installed over each of the walls 106a-106d to secure the edge portions 108 in place. FIG. 4 illustrates the containment system 100 with some brackets 112 already installed on the walls 106b and 106d and other brackets 112 sitting on the ground waiting to be installed. As shown in FIG. 4, each bracket 112 fits over a portion of a wall 106a-106d, where an edge portion 108 of the floor 104 is also wrapped over the top surface of the corresponding wall 106a-106d.

In this example, the brackets 112 have a cross-sectional shape that resembles an upside-down 'U'. The top and sides of each bracket 112 can be formed of thin metal bars (such as rebar) that are bent into a U shape and that can flex for easy assembly over the walls 106a-106d, although the brackets 112 can be formed from any other suitable materials (e.g., aluminum or plastic) and in any other suitable manner. Further details of the bracket 112 are described below in conjunction with FIG. 9. The width of each bracket 112 can be selected to be substantially the same as, slightly larger than, or slightly smaller than the width of each wall section 110. In some embodiments, the width of each bracket 112 is slightly smaller than the width of each wall section 110 so that, once installed, the bracket 112 firmly grips the sides of the corresponding wall 106a-106d. Also, in some embodiments, the width of each bracket 112 can be slightly adjusted manually, such as by spreading or compressing the sides of the bracket 112. This can be helpful to achieve a snug fit on the wall 106a-106d. Metal plates or other plates at the bottom of each bracket 112 can be used to contact the sides of the walls 106a-106d and provide a gripping surface. Further, the height of each bracket 112 can be selected to be substantially the same as, slightly larger than, or slightly smaller than the height of each wall section 110. In some embodiments, the height of each bracket 112 can be selected to be somewhat less than the height of each wall section 110 so that the installed bracket 112 extends down the side of the wall 106a-106d but does not reach the ground. In particular embodiments, the height of each bracket 112 is approximately one-half to three-quarters the height of each wall section 110.

Figure 5:
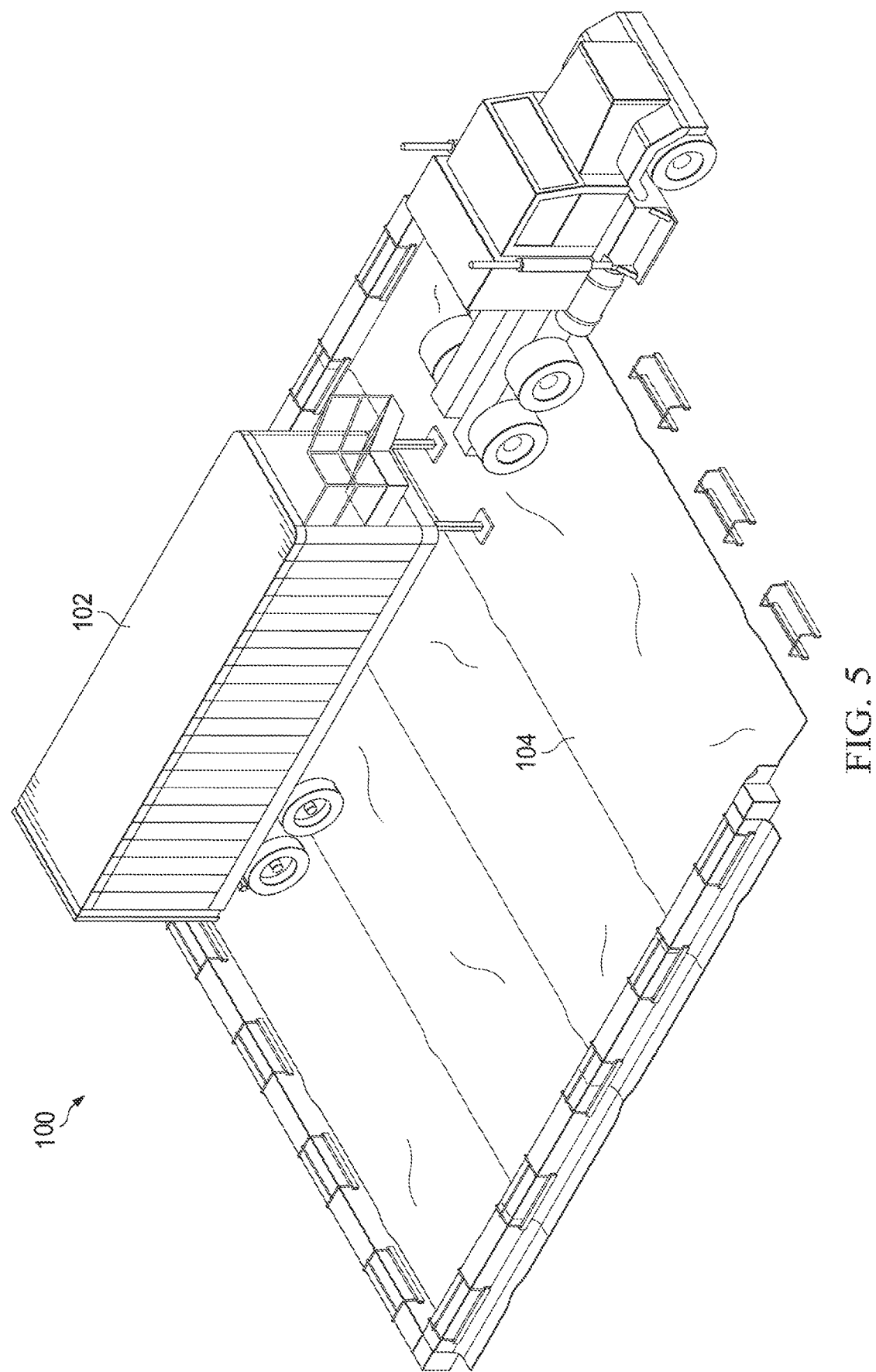

As shown in FIG. 5, once three walls 106b-106d of the containment system 100 are formed, one or more storage containers 102 or other structures can be placed within the containment system 100. In this example, one or more storage containers 102 are moved onto the floor 104 of the containment system 100 using a truck, although any number of storage containers 102 may be placed onto the floor 104 in any suitable manner (either using people or machinery). The one or more storage containers 102 here may or may not already contain material that might leak out of the storage containers 102. The absence of the front wall 106a makes this process easier since the one or more storage containers 102 do not have to be lifted over the wall 106a. Instead, the one or more storage containers 102 can be rolled over the flat floor 104 into position. Once the one or more storage containers 102 are in place, the front wall 106a can be constructed in the same manner as the other walls 106b-106d. The fully-assembled containment system 100 is shown in FIG. 1. Here, the containment system 100 includes a floor and walls that include a single continuous impermeable shield, thus providing an impermeable containment system for the material(s) stored in the containers 102.

Due to the modular nature of its components, the containment system 100 can be easily assembled and disassembled in a short time, without the need for complex machinery or tools. For example, the brackets 112 are easily installed over and removed from the walls 106a-106d. Also, each of the wall sections 110 and the brackets 112 can be lightweight so that they can be moved and manipulated by one or more people. Once assembled and in position, the containment system 100 provides an impermeable containment system that can remain in place for days, weeks, months, or even years. Once disassembled, the components of the containment system 100 can be easily transported to another location for assembly at that location.

Although FIGS. 1 through 5 illustrate one example of a containment system 100, various changes may be made to FIGS. 1 through 5. For example, the relative sizes, shapes, and dimensions of the components of the containment system 100 are for illustration only. As noted above, the containment system 100 can have any suitable size and shape, and the components forming the containment system 100 can have any desired dimensions. The containment system 100 could be of virtually any size as long as there is enough space to create walls for containing material meant to be contained. Also, the containment system 100 may be formed in any suitable manner and need not be constructed as shown in FIGS. 1 through 5. As a particular example, one or more components of the containment system 100 do not need to be fabricated elsewhere and transported to a site where the containment system 100 is being assembled. For instance, the floor 104 of the containment system 100 could be fabricated at the installation site, such as by laying down one or more pieces of fabric or other geotextile like felt and spraying the geotextile with an impermeable material like polyurea. Also, the wall sections 110 of the containment system 100 could be cut or otherwise trimmed at the installation site. As another particular example, the wall sections 110 for at least some of the walls 106a-106d could be positioned first, and the floor 104 could then be placed within the area between those walls 106a-106d and draped over the already-positioned wall sections 110. In addition, while the use of certain materials (such as polyurea) is described here, any other suitable materials can be used to form the containment system 100. For instance, any suitable fabrics or other geotextiles could be used in the containment system 100 and covered with polyurea or other liquid-impervious material(s). In some embodiments, the polyurea or polyurea-covered fabric could be fire retardant.

Figure 6:
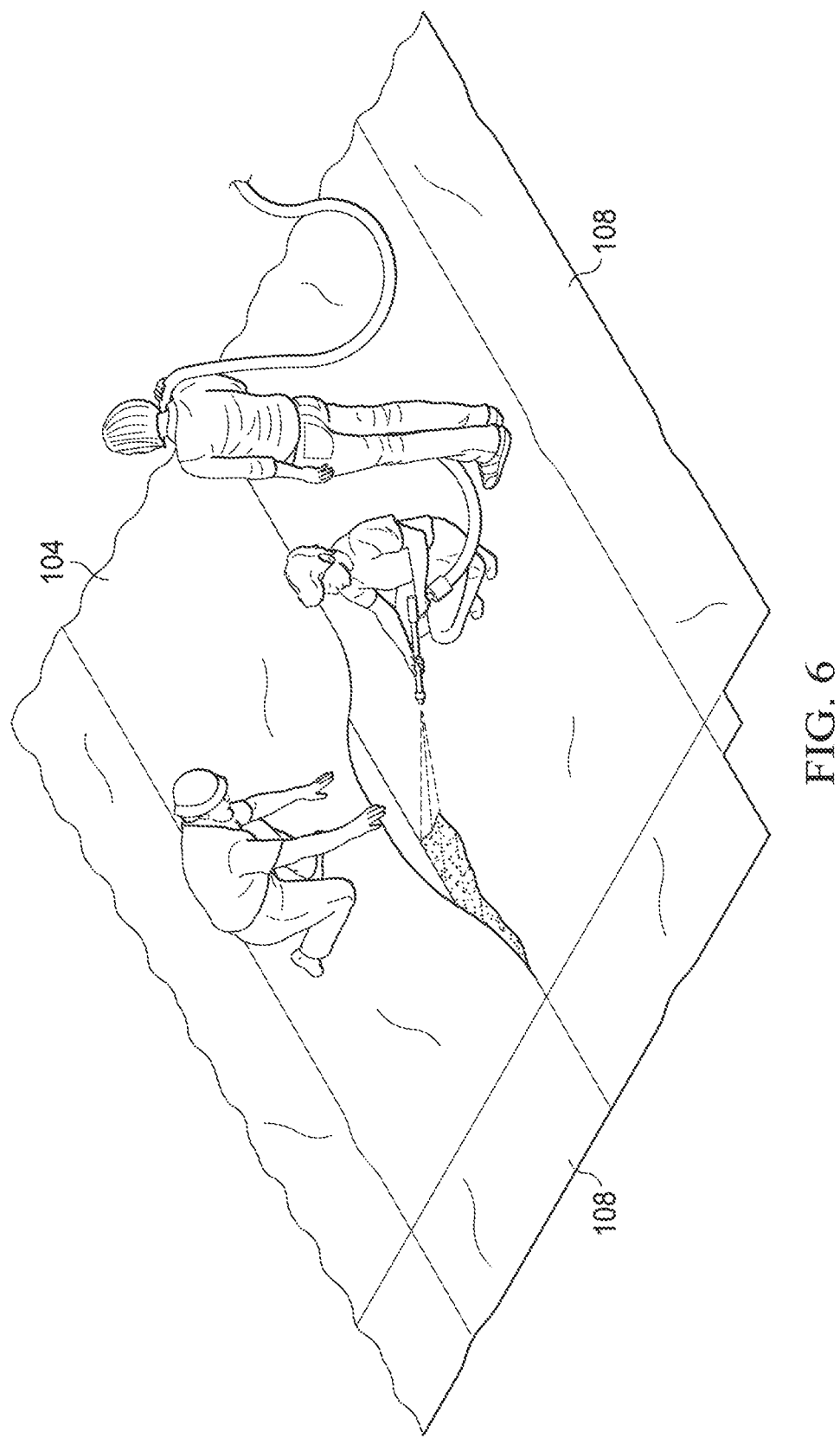

FIGS. 6 through 13 illustrate portions of the containment system 100 in various stages of manufacture in accordance with this disclosure. As shown in FIG. 6, the floor 104 is being prepared at a factory, warehouse, or other "off-site" location (meaning a location where the containment system 100 is not going to be installed). A desired final size of the containment system 100 can be identified, which includes the length and width of the floor 104 and the height of the walls 106a-106d. Once the height of the walls 106a-106d is known, the width of the edge portions 108 of the floor 104 can be determined with a high degree of accuracy. For example, the widths of the edge portions 108 can be long enough to extend up the inside surfaces of the walls 106a-106d, across the tops of the walls 106a-106d, and down at least a portion of the outside surfaces of the walls 106a-106d. An example of this is shown in FIGS. 4 and 10.

Once the desired final size of the containment system 100 is identified, the floor 104 can be prepared according to that size. For example, the size of the floor 104 in each of its length and width dimensions can be determined by adding twice the width of the edge portions 108 to the desired length or width of the containment system 100. If the floor 104 has a desired size that fits within the size of a premanufactured floor (such as when bulk fabric has already been sprayed or otherwise coated with an impermeable material), the floor 104 can simply be cut to a desired size. If the size of the floor 104 is wider than the bulk fabric, multiple pieces of the fabric can be placed side by side and bonded or otherwise joined together. The fabric pieces can be joined together using a liquid adhesive or a heat-activated adhesive, by spraying the seams with impermeable material like polyurea, or using any other suitable joining technique. The end result of this process can be a single-piece impermeable floor 104. It should be noted, however, that the floor 104 may be assembled or otherwise formed in any other suitable manner, including formation on-site (where the containment system 100 is being assembled).

Figure 7:
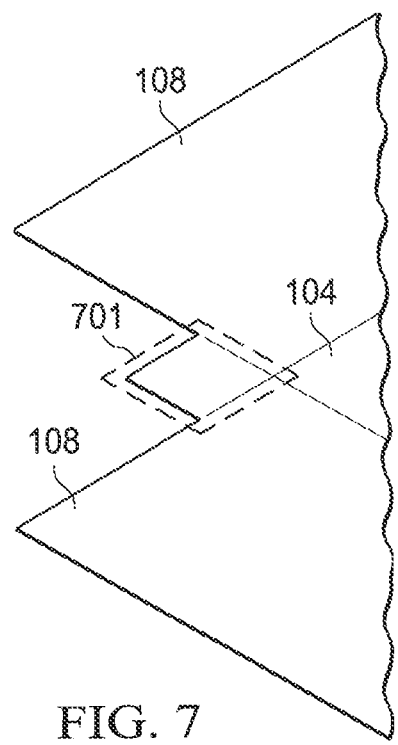

FIGS. 6 and 7 show the floor 104 with the edge portions 108 extending from two sides of the floor 104. Also shown in FIG. 7 is a corner portion 701 that connects two edge portions 108. When the containment system 100 is installed and the edge portions 108 are folded up and over the corresponding walls 106a-106d, the corner portion 701 is brought into an upright position. The corner portion 701 provides an uninterrupted barrier at each corner of the containment system 100, thus preventing any leakage at the corners of the containment system 100.

Figure 8:
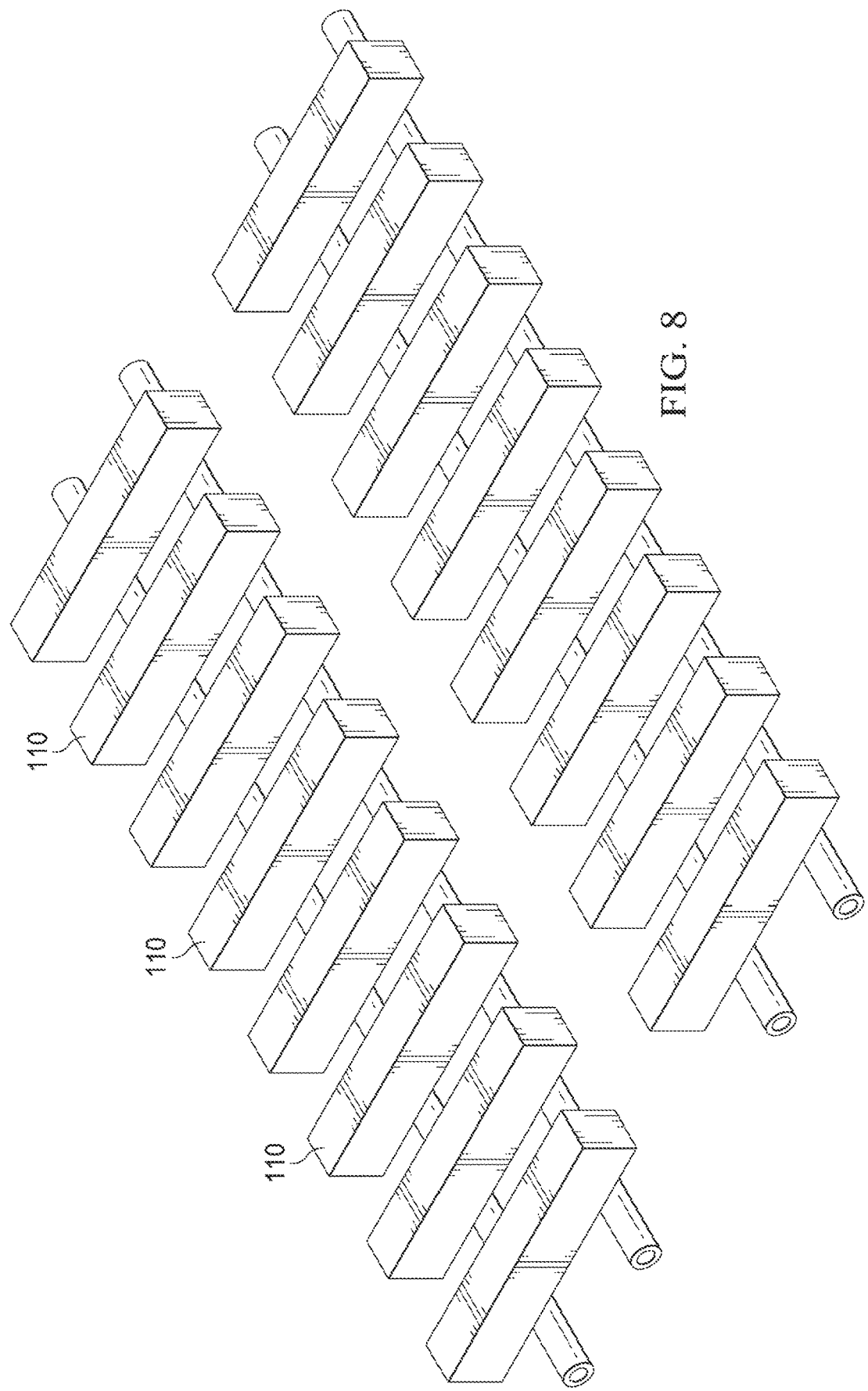

FIG. 8 illustrates multiple wall sections 110 in the factory, warehouse, or other off-site location. Each containment system 100 includes multiple wall sections 110, which can typically be of uniform height and width. For example, the height and width of the wall sections 110 can be selected based on the desired final size of the containment system 100 and the amount of material that will be stored within the footprint of the installed containment system 100. As a particular example, a larger height and a larger width might be selected for a containment system 100 that surrounds multiple large storage tanks holding thousands of gallons of hazardous material, while a smaller height and a smaller width might be selected for a containment system that surrounds a single tank holding hundreds of gallons of material.

As shown in FIG. 8, the lengths of the wall sections 110 may be uniform or non-uniform for a particular storage containment system 100. Depending on the desired final length and width of the containment system, the wall sections 110 might include multiple wall sections 110 of a standard length and one or more wall sections 110 of a remainder length. For example, if the storage containment system 100 has a desired final length of 49 feet, one or more walls 106a-106d might each be formed of four ten-foot wall sections 110 and one nine-foot wall section 110, or one or more walls 106a-106d might each be formed of seven seven-foot wall sections 110. Because the wall sections 110 are formed of lightweight foam or other lightweight but rigid and strong material, the wall sections 110 can be easily machined or otherwise trimmed into any desired height, width, and length.

Figure 9:
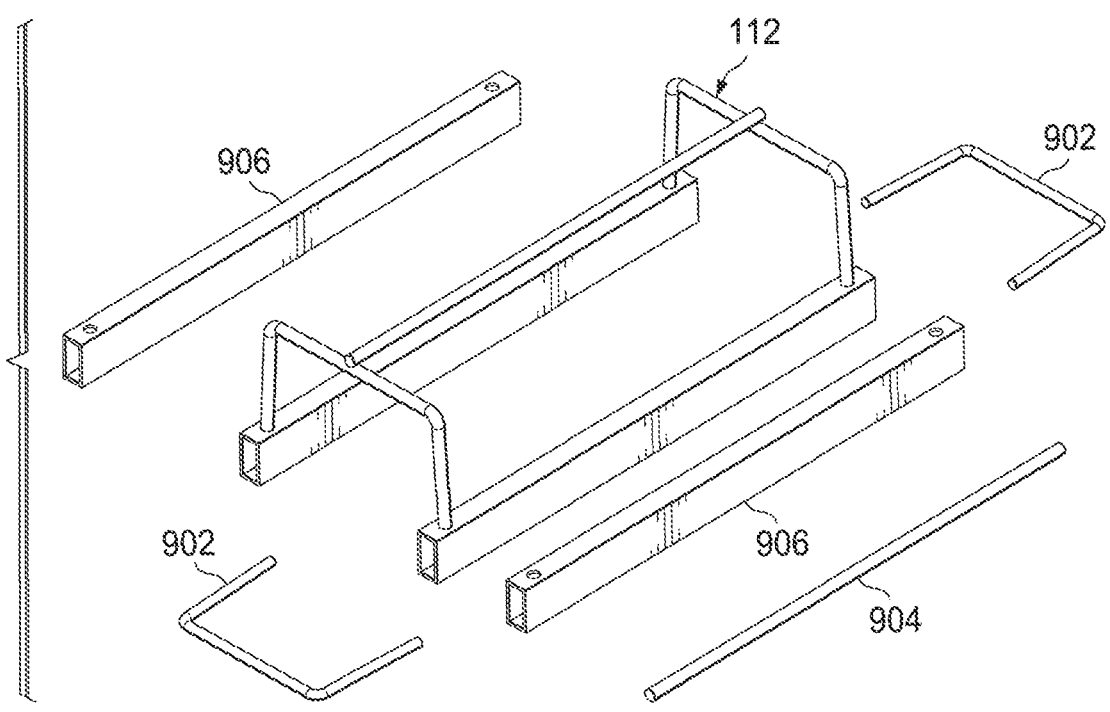

FIG. 9 illustrates one instance of an assembled bracket 112 and components 902-906 that form another instance of a bracket 112. As shown in this example, each bracket 112 includes two U-shaped bars 902 that are connected at the top by a cross bar 904. In some embodiments, the U-shaped bars 902 and the cross bar 904 are formed of metal, such as rebar. In other embodiments, the U-shaped bars 902 and/or the cross bar 904 may be formed of other materials, such as aluminum or rigid plastic. Each bracket 112 also includes two plates 906 disposed at the bottom of the two U-shaped bars 902. The plates 906 can be formed of a rigid material, such as metal, plastic, or wood. In some embodiments, the plates 906 are formed of steel or aluminum channel tubing that has a rectangular cross-section. Once assembled, each bracket 112 can be painted, powder coated, or otherwise coated for aesthetic reasons or to protect the bracket 112 from environmental conditions. Note that the use of two bars 902, a single cross bar 902, and two plates 906 are for illustration only. Each bracket 112 could have a single bar 902 or more than two bars 902, could omit the cross bar 902 or include more than one cross bar 902, and/or could include more than two plates 906.

It should be noted that the exact shape of each bracket 112 can vary based on the design of the walls 106a-106d to be used with the brackets 112. For example, when the wall sections 110 are formed as rectangular prisms, the bars 902 of the brackets 112 can be U-shaped or have a similar shape to fit around the rectangular prisms. If the wall sections 110 have a different cross-sectional shape, the bars 902 of the brackets 112 can have a complementary shape in order to fit snugly against the wall sections 110. Also, the top of each bracket 112 here is generally orthogonal to the sides of that bracket 112, although again this is not required and can vary based on the cross-sectional shape of the wall sections 110.

Figure 13:
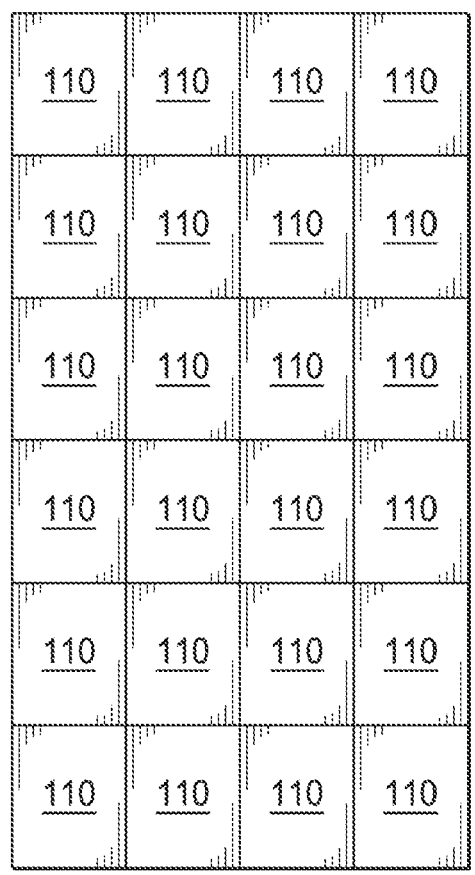

FIG. 10 illustrates a test assembly of the containment system 100 in the factory, warehouse, or other off-site location before the containment system 100 is packaged for transport to an intended installation site. As shown in FIG. 10, a worker positions one of the brackets 112 on one of the walls 106a-106d. Such a test assembly can be performed to ensure that all of the components are present and assemble together in an expected manner. Once the test assembly is complete, the containment system 100 can be disassembled and packaged for shipment. Of course, the test assembly of the containment system 100 is not required, and the containment system 100 can simply be manufactured and then packaged for shipment. FIG. 11 shows the prepared (cut) floor 104 being folded at the factory, warehouse, or other off-site location, and FIG. 12 shows workers rolling a folded floor 104 onto a spool 1201 for easy transport to an intended installation site. FIG. 13 shows multiple wall sections 110 stacked together for transport. Again, however, Although FIGS. 6 through 13 illustrate portions of the containment system 100 in various stages of manufacture, various changes may be made to FIGS. 6 through 13. For example, various possible alternative fabrication techniques have been noted above, such as the formation of the floor 104 or the trimming of the wall sections 110 on-site. Also, the various components of the containment system 100 can be formed, packaged, and assembled in any suitable manner, and the specific techniques shown in FIGS. 6 through 13 are for illustration only.

Figure 14:
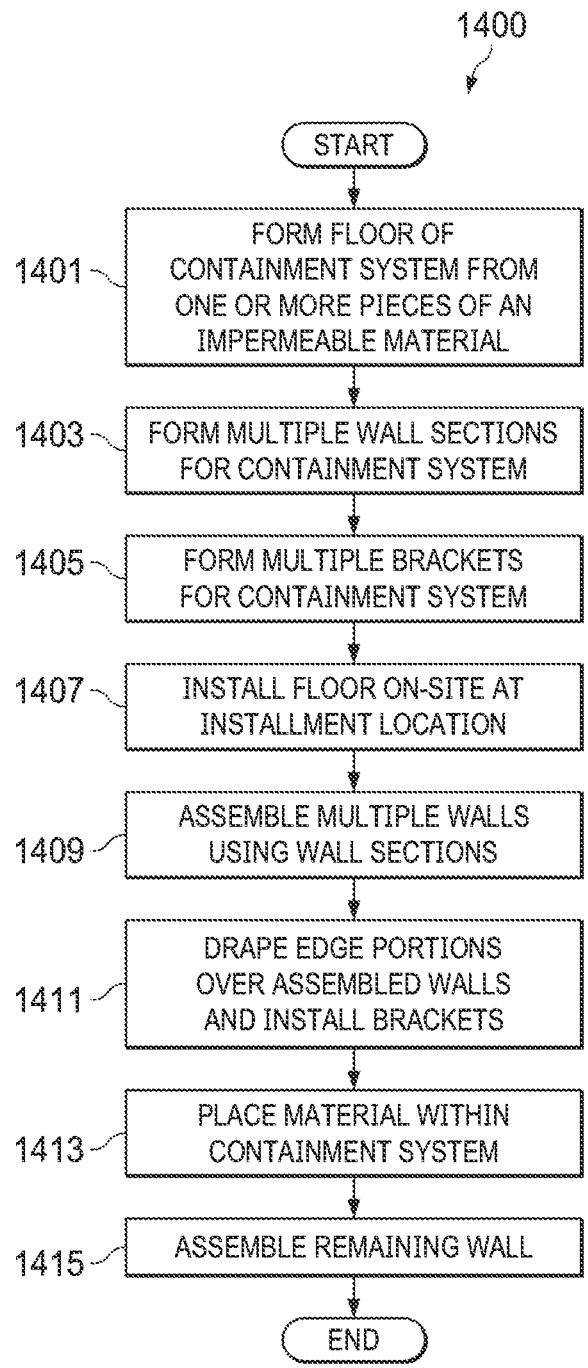
FIG. 14 illustrates an example method for forming a containment system in accordance with this disclosure.

FIG. 14 illustrates an example method 1400 for forming a containment system in accordance with this disclosure. For ease of explanation, the method 1400 is described as involving the formation of the containment system 100 shown in FIGS. 1 through 13. However, the method 1400 may involve the formation of any other containment system designed in accordance with the teachings of this disclosure.

At step 1401, a floor is formed from one or more pieces of an impermeable material. As noted above, the floor 104 can be formed off-site or on-site, and the floor 104 can be formed by cutting a single larger piece of flooring material or by joining multiple pieces of flooring material. The floor 104 is formed to have multiple edge portions 108, where each edge portion 108 corresponds to one edge of the floor 104. In some embodiments, the floor 104 is formed of polyurea or a polyurea-coated fabric. Also, in some embodiments, the floor 104 can be trimmed to form a corner portion 701 at each corner, where each corner portion 701 is configured to connect adjacent edge portions 108.

At step 1403, multiple wall sections are obtained and trimmed or otherwise formed such that the wall sections can be used to form multiple free-standing walls around a perimeter of the floor. Again, as noted above, the wall sections 110 can be formed off-site or on-site. In some embodiments, each of the wall sections 110 can be formed by forming wall material to a desired length or by cutting wall material to the desired length. Each of the walls 106a-106b corresponds to one of the edge portions 108 of the floor 104. In particular embodiments, the wall sections 110 have a shape of a rectangular prism and are formed of a rigid polyurea foam. Also, in particular embodiments, each wall section 110 has a height of approximately twenty inches and a width of approximately twelve inches.

At step 1405, multiple brackets are formed. Each bracket 112 is configured to fit over one of the multiple walls 106a-106d after the corresponding edge portion 108 of the floor 104 is draped over the wall 106a-106d. Each bracket 112 can be configured to fit tightly against sides of the wall 106a-106d so as to hold the corresponding edge portion 108 firmly in place. In some embodiments, each bracket 112 is formed out of rebar and channel tubing. Also, in some embodiments, each bracket 112 includes first and second plates 906 connected using multiple U-shaped bars 902, and the bars 902 may be connected to one another using a cross bar 904. In particular embodiments, the first and second plates 906 are formed using channel tubing, and the bars 902 and cross bar 904 are formed using rebar.

At step 1407, the floor 104 is installed on-site at an intended installment location. This can include the floor 104 being unfolded or unrolled and spread out on a flat surface, such as the ground. Edge portions 108 on all but one edge of the floor 104 can be folded back onto the top surface of the floor 104.

At step 1409, multiple walls 106b-106d are assembled by positioning wall sections 110 end to end around a perimeter of the floor 104, such as shown in FIG. 2. At least one wall 106a remains unformed during this step to allow material to be placed on the floor 104.

At step 1411, the edge portions 108 are draped over the walls 106b-106d to form an impermeable transition from the floor 104 to the walls 106b-106d, and brackets 112 are installed over each of the walls 106b-106d to secure the edge portions 108 in place, such as shown in FIG. 4.

At step 1413, one or more storage containers 102 or other structures are placed within the containment system 100. For example, one or more storage containers 102 can be moved onto the floor 104 of the containment system 100 using a truck, although any number of storage containers 102 may be placed onto the floor 104 in any suitable manner (either using people or machinery).

At step 1415, the remaining wall 106a is assembled by positioning wall sections 110 end to end, edge portions 108 are draped over the wall 106a, and brackets 112 are installed over the wall 106a to secure the edge portions 108. The assembled containment system 100 includes a floor and walls that include a single continuous impermeable shield, thus providing an impermeable containment system for the material(s) stored in the containers 102.

Although FIG. 14 illustrates one example of a method 1400 for forming a containment system 100, various changes may be made to FIG. 14. For example, while shown as a series of steps, various steps in FIG. 14 could overlap, occur in parallel, occur in a different order, or occur any number of times. Also, while the use of certain materials (such as polyurea and rebar) is described above, any other suitable materials can be used to form the containment system 100.

It may be advantageous to set forth definitions of certain words and phrases that have been used within this patent document. The terms "include" and "comprise," as well as derivatives thereof, mean inclusion without limitation. The term "or" is inclusive, meaning and/or. The phrase "associated with" and derivatives thereof may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. An apparatus comprising:
a floor comprising an impermeable material, the floor having multiple edge portions, each of the edge portions corresponding to an edge of the floor;
multiple wall sections configured to form multiple free-standing walls around a perimeter of the floor, each of the walls corresponding to one of the edge portions; and
multiple brackets, each of the brackets configured to fit over an associated one of the walls after the corresponding edge portion of the floor is draped over the associated wall, each of the brackets configured to fit against sides of the associated wall so as to hold the corresponding edge portion in place;
wherein each of the brackets comprises (i) first and second plates disposed on opposite sides of the associated wall and (ii) one or more bars extending over a top surface of the associated wall and directly connecting the first and second plates;
wherein each bar has a longest dimension oriented in a same direction that the corresponding edge portion of the floor is draped over the associated wall; and
wherein, for each of at least one of the brackets, multiple bars of the bracket are connected together with at least one cross bar.

2. The apparatus of claim 1, wherein each of the brackets is sized such that, once installed over the associated wall, the first and second plates of the bracket are positioned at approximately one-half of a height of the associated wall.

3. The apparatus of claim 1, wherein each of the brackets has a painted or powder-coated finish.

4. The apparatus of claim 1, wherein each of the wall sections has a rectangular prism shape and comprises rigid polyurea foam.

5. The apparatus of claim 1, wherein each of the wall sections has a height of approximately twelve to eighteen inches and a width of approximately twelve inches.

6. The apparatus of claim 1, wherein the floor includes a corner portion at each corner, each corner portion configured to connect two adjacent edge portions.

7. An apparatus comprising:
a floor comprising an impermeable material, the floor having multiple edge portions, each of the edge portions corresponding to an edge of the floor;
multiple wall sections configured to form multiple free-standing walls around a perimeter of the floor, each of the walls corresponding to one of the edge portions; and
multiple brackets, each of the brackets configured to fit over an associated one of the walls after the corresponding edge portion of the floor is draped over the associated wall, each of the brackets configured to fit against sides of the associated wall so as to hold the corresponding edge portion in place;
wherein each of the brackets comprises (i) first and second plates disposed on opposite sides of the associated wall and (ii) one or more bars extending over a top surface of the associated wall and connecting the first and second plates; and
wherein the first and second plates of each of the brackets are formed of channel tubing.

8. An apparatus comprising:
a floor comprising an impermeable material, the floor having multiple edge portions, each of the edge portions corresponding to an edge of the floor;
multiple wall sections configured to form multiple free-standing walls around a perimeter of the floor, each of the walls corresponding to one of the edge portions; and
multiple brackets, each of the brackets configured to fit over an associated one of the walls after the corresponding edge portion of the floor is draped over the associated wall, each of the brackets configured to fit against sides of the associated wall so as to hold the corresponding edge portion in place;
wherein each of the brackets comprises (i) first and second plates disposed on opposite sides of the associated wall and (ii) one or more bars extending over a top surface of the associated wall and directly connecting the first and second plates;
wherein each bar has a longest dimension oriented in a same direction that the corresponding edge portion of the floor is draped over the associated wall; and
wherein the one or more bars of each of the brackets are formed of rebar.

9. A method comprising:
forming a floor comprising an impermeable material, the floor having multiple edge portions, each of the edge portions corresponding to an edge of the floor;
forming multiple free-standing walls around a perimeter of the floor using multiple wall sections, each of the walls corresponding to one of the edge portions; and
forming multiple brackets, each of the brackets configured to fit over an associated one of the walls after the corresponding edge portion of the floor is draped over the associated wall, each of the brackets configured to fit against sides of the associated wall so as to hold the corresponding edge portion in place;
wherein each of the brackets comprises (i) first and second plates disposed on opposite sides of the associated wall and (ii) one or more bars extending over a top surface of the associated wall and directly connecting the first and second plates;
wherein each bar has a longest dimension oriented in a same direction that the corresponding edge portion of the floor is draped over the associated wall; and
wherein forming the multiple brackets comprises, for each of the brackets, connecting multiple bars of the bracket together with at least one cross bar.

10. The method of claim 9, wherein forming the floor comprises forming a corner portion at each corner of the floor, each corner portion configured to connect two adjacent edge portions.

11. The method of claim 9, wherein each of the one or more bars has a substantially circular cross section.

12. A method comprising:
forming a floor comprising an impermeable material, the floor having multiple edge portions, each of the edge portions corresponding to an edge of the floor;
forming multiple free-standing walls around a perimeter of the floor using multiple wall sections, each of the walls corresponding to one of the edge portions; and
forming multiple brackets, each of the brackets configured to fit over an associated one of the walls after the corresponding edge portion of the floor is draped over the associated wall, each of the brackets configured to fit against sides of the associated wall so as to hold the corresponding edge portion in place;

wherein each of the brackets comprises (i) first and second plates disposed on opposite sides of the associated wall and (ii) one or more bars extending over a top surface of the associated wall and connecting the first and second plates; and wherein forming the multiple brackets comprises forming the first and second plates of each of the brackets using channel tubing.

13. A method comprising:

forming a floor comprising an impermeable material, the floor having multiple edge portions, each of the edge portions corresponding to an edge of the floor;

forming multiple free-standing walls around a perimeter of the floor using multiple wall sections, each of the walls corresponding to one of the edge portions; and forming multiple brackets, each of the brackets configured to fit over an associated one of the walls after the corresponding edge portion of the floor is draped over the associated wall, each of the brackets configured to fit against sides of the associated wall so as to hold the corresponding edge portion in place;

wherein each of the brackets comprises (i) first and second plates disposed on opposite sides of the associated wall and (ii) one or more bars extending over a top surface of the associated wall and directly connecting the first and second plates;

wherein each bar has a longest dimension oriented in a same direction that the corresponding edge portion of the floor is draped over the associated wall; and wherein forming the multiple brackets comprises forming the one or more bars of each of the brackets using rebar.

14. A method comprising:

installing a floor of a containment system at a location for storing one or more materials, the floor comprising an impermeable material, the floor having multiple edge portions;

assembling multiple free-standing walls of the containment system around a perimeter of the floor, each of the walls corresponding to one of the edge portions; and draping the edge portions over the corresponding walls and installing multiple brackets over the walls, each of the brackets configured to fit against sides of an associated one of the walls so as to hold the corresponding edge portion in place;

wherein each of the brackets comprises (i) first and second plates disposed on opposite sides of the associated wall and (ii) one or more bars extending over a top surface of the associated wall and directly connecting the first and second plates;

wherein each bar has a longest dimension oriented in a same direction that the corresponding edge portion of the floor is draped over the associated wall; and wherein, for each of at least one of the brackets, multiple bars of the bracket are connected together with at least one cross bar.

15. The method of claim 14, wherein each of the brackets is sized such that, once installed over the associated wall, the first and second plates of the bracket are positioned at approximately one-half of a height of the associated wall.

16. The method of claim 14, wherein each of the brackets has a painted or powder-coated finish.

17. The method of claim 14, wherein the free-standing walls are assembled using multiple wall sections, each of the wall sections having a rectangular prism shape and comprising rigid polyurea foam.

18. The method of claim 17, wherein each of the wall sections has a height of approximately twelve to eighteen inches and a width of approximately twelve inches.

19. The method of claim 14, wherein each of the one or more bars has a substantially circular cross section.

20. An apparatus comprising:

a floor comprising an impermeable material, the floor having multiple edge portions, each of the edge portions corresponding to an edge of the floor;

multiple wall sections configured to form multiple free-standing walls around a perimeter of the floor, each of the walls corresponding to one of the edge portions; and multiple brackets, each of the brackets configured to fit over an associated one of the walls after the corresponding edge portion of the floor is draped over the associated wall, each of the brackets configured to fit against sides of the associated wall so as to hold the corresponding edge portion in place;

wherein each of the brackets comprises (i) first and second plates disposed on opposite sides of the associated wall and (ii) one or more bars extending over a top surface of the associated wall and directly connecting the first and second plates;

wherein each bar has a longest dimension oriented in a same direction that the corresponding edge portion of the floor is draped over the associated wall; and wherein each of the one or more bars has a substantially circular cross section.

* * * * *